US006242038B1

(12) United States Patent
Guzinski et al.

(10) Patent No.: US 6,242,038 B1
(45) Date of Patent: *Jun. 5, 2001

(54) READILY-DISPERSIBLE LIPIDIC HOP EXTRACT FOR IMPARTING HOPPY AROMA AND FLAVOR TO BEER

(75) Inventors: James A. Guzinski; Mark H. Schulze, both of Kalamazoo, MI (US)

(73) Assignee: Kalamazoo Holdings, Inc., Kalamazoo, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/972,914

(22) Filed: Nov. 18, 1997

Related U.S. Application Data

(63) Continuation of application No. 08/305,134, filed on Sep. 13, 1994, now Pat. No. 5,750,179.

(51) Int. Cl.⁷ ...................................................... C12C 3/00
(52) U.S. Cl. ............................................................ 426/600
(58) Field of Search .................................... 426/600, 592

(56) References Cited

U.S. PATENT DOCUMENTS

| | | | |
|---|---|---|---|
| 1,149,704 | * 8/1915 | Wahl | 426/600 |
| 3,298,835 | * 1/1967 | Hildebrand et al. | 426/600 |
| 3,364,265 | * 1/1968 | Klingel et al. | 426/600 |
| 3,730,730 | * 5/1973 | Rigby | 426/600 |
| 3,839,588 | * 10/1974 | Sweett et al. | 426/600 |
| 3,870,810 | * 3/1975 | Humphrey | 426/329 |
| 5,073,396 | * 12/1991 | Todd, Jr. | 426/592 |
| 5,200,227 | * 4/1993 | Guzinski et al. | 426/600 |
| 5,750,179 | * 5/1998 | Guzinski et al. | 426/600 |
| 5,972,411 | 10/1999 | Goldstein et al. . | |

FOREIGN PATENT DOCUMENTS

2919232 * 11/1980 (DE) .
1376306 * 12/1974 (GB) .

OTHER PUBLICATIONS

Kowka et al, EBC Congress 1983, pp. 73–77.
Peacock et al, ACS Symposium Series, No. 170, p. 119–127 (1981).
Peacock et al, J. ASBC, vol. 34, No. 4., pp. 136..141 (1981).
Haley et al, J. Inst. Brew. Mar.–Apr. 1983, vol. 89, pp. 87–91.
Seaton et al, Proc. of the Austr. Brewi. Conv., 1982, pp. 117–124.
Peacock et al, J. Ag. and Food Chem., 1981, 29, pp. 1265–1269.

Peacock, J. ASBC, vol. 39, No. 4 (1981), p. 141, *Chemistry of Hop Aroma in Beer*.

Sharpe et al, Brew Research Foundation, 1981, 87, pp.96–107.

Sharpe et al, J. Inst. Brew. Sep.–Oct. 1988, vol. 95, 301–305.

Papazian, "The New Complete Joy of Home Brewing," Avon Books, New York, Copyright 1991, pp. 76–77.

Shelton, New Brewer, Mar./Apr., 1998, pp. 59–66.

New Zealand Hop Marketing Board, Pocket Converter.

KALSEC Product Specification for KAE–4/3B, Oct. 1999.

KALSEC Product Specification for KAE, Oct. 1999.

JRA Pollock, Brewing Science, vol. 1, Academic Press, New York, 1979, p. 282.*

Demiereva et al, Jnl. Inst. Brew. Nov.–Dec. 1995 vol. 101, pp. 437–438.

Verzele et al, Chemistry and Analysis of Hop and Beer Bitter Acids, Elsvier, New York 1991, pp. 8 & 9.

The Practical Brewer, Master Brewers Assoc. of Americas Madison, Wisc, 1977 pp. 136–146.*

* cited by examiner

*Primary Examiner*—Curtis E Sherrer
(74) *Attorney, Agent, or Firm*—The Firm of Hueschen and Sage

(57) ABSTRACT

A water-dispersible lipidic hop extract composition, comprising at least 10% by weight of free fatty acid substances derived from hops, is useful to increase the utilization of the hop aroma and flavor components. It may be produced by treatment of an extract of hops with an excess of alkali. The starting hop extract, made conventionally as by extraction with organic solvent or carbon dioxide, preferably has alpha, isoalpha, and beta hop acids removed before treatment with excess alkali. A cosolvent, such as a lower alkanol, polyol, or wetting agent, heat, or high shear may be used to improve mixing of the lipidic organic phase of the hop extract with the excess alkali. The water-dispersible lipidic hop extract imparts an enhanced hop aroma and flavor upon addition to the wort at some point during the brewing process between boiling and the beginning of fermentation. A beer incorporating the dispersible lipidic hop extract has a stronger hop aroma and flavor than beer incorporating the usual hop extract.

8 Claims, No Drawings

READILY-DISPERSIBLE LIPIDIC HOP EXTRACT FOR IMPARTING HOPPY AROMA AND FLAVOR TO BEER

The present application is a continuation of our prior-filed application Ser. No. 08/305,134, filed Sep. 13, 1994, now U.S. Pat. No. 5,750,179, issued May 12, 1998.

FIELD OF THE INVENTION

Readily-dispersible FFA-containing lipidic hop extracts for improving hoppy aroma and flavor in beer; their preparation using an excess of alkali.

BACKGROUND OF THE INVENTION AND PRIOR ART

In order that brewers might have more control of the consistency and uniformity of their product, many have gone to the use of hop extracts to maximize control over the extremely variable aroma and taste characteristics of raw hops. Hop extracts have been used to flavor malt beverages for some years and offer a level of consistency and economy not attainable with raw hops. To prepare such extracts, the raw hops or hop pellets are commonly extracted with an organic solvent such as hexane or ethanol. Subcritical or supercritical carbon dioxide is sometimes used as the extraction solvent. Alpha and beta hop acids, present in the raw extract, are then preferably removed for further processing to manufacture bittering agents for beer, as in Todd U.S. Pat. No. 4,002,683, Guzinski et al. U.S. Pat. No. 5,200,227, and Stegink et al. U.S. Pat. No. 5,296,637. The remaining lipidic organic alpha and beta acid-free hop extract (i.e., the non-acidic resin) contains waxes, tannins, vegetable oils, and the hop essential oils, and is virtually insoluble in water. It can be added at kettle boil as in Todd U.S. Pat. No. 5,073,396. Hop oils are essential to beer if it is to have a desirable hoppy aroma and flavor.

Hop extracts used for bittering beer post-fermentation typically have an inadequate aroma component to impart a hoppy aroma or flavor to beer. Hop oils and lipidic flavor and aroma components in the hop extract, remaining after the removal of alpha and beta acids, are difficult to reincorporate back into the beer due to their lipidity and virtual insolubility in water. If the lipidic oils are added directly to the kettle boil, they normally float out and are usually lost to evaporation or become lost with trub removal. The utilization of the hop oils is also very low with hop cones, hop pellets, and hop extracts when they are added to the boiling wort, since few if any of the lipidic hop aroma and flavor components are dispersed through the wort.

Efforts to overcome the problem of reintroducing the hop oils into the wort have been made in recent years by preparing emulsions of these oils using emulsifiers such as polysorbate 80, or by dispersing them on fumed silica (Todd et al. U.S. Pat. No. 4,647,464). Each of these procedures has its shortcomings. Although polysorbate does effectively disperse the hop oil throughout the wort during the kettle boil, these emulsions introduce polysorbate, which can become rancid and add undesirable, objectionable flavors to the beer. Brewers are also concerned that their beer does not contain materials which must be labelled as additives. On the other hand, the fermentation process, which modifies hop oils, is considered to develop desirable hop aroma and flavor by the action of yeast on the oils.

To produce a light-stable beer, which does not form a mercaptan aroma upon exposure to light, a reduced hop isoalpha acid which does not contain unreduced isoalpha acids may be used. (Stegink et al., U.S. Pat. No. 5,296,637; Worden, U.S. Pat. No. 3,923,897; Hay, U.S. Pat. No. 5,013,571). These reduced acids 30 are made by separating the alpha and beta acids from the whole hop extracts and reducing these acids to light-stable forms (i.e., di, tetra, and hexahydroisohumulones). The remaining hop extract, free of alpha and beta acids, can be used in the kettle to impart a hop aroma and flavor. However, Goldstein (U.S. Pat. No. 4,759,941, U.S. Pat. No. 4,324,810) has disclosed that non-isohumulone, light-unstable products exist in hop extracts, and these may still be present in the extract from which the hop acids have been removed. Goldstein discloses a method for their removal if they carry through into the reduced iso-alpha acids. He discards the non-acidic resin portion of his extract, thereby losing the benefit of the hop oils contained therein. A critical and unpredictable result of the current invention is that none of Goldstein's unstable substances are present in the lipidic alkali-treated extract of the invention, thus making it suitable for the production of light-stable beers. Because Goldstein's light-unstable extract has been reduced with borohydride, it is even more unexpected that the alkali-solubilized lipidic hop extract products of the present invention should be light stable. The present invention therefore provides a method and composition for greatly increasing the effectiveness of a hop extract, which is used only for imparting hop aroma and flavor, and which is compatible with all forms of hop extracts used for bittering and with all methods of hop addition.

Accordingly, a composition and method for imparting hop aroma and flavor to beer, by which an improved and readily-dispersible lipidic hop extract can be reproducibly and economically provided and added to the wort without introducing non-hop constituents or resulting in objectionable flavors or light sensitivity, will be of great advantage to the art of brewing. It is an object of this invention to provide such a readily-dispersible hop extract and advantage.

OBJECTS OF THE INVENTION

The present invention has as an object the improvement of the utilization and dispersion of hop flavor and aroma in beer by addition before fermentation of a lipidic hop extract having improved water dispersibility. Another object is the provision of a readily-dispersible lipidic hop extract, made by treatment of a hop extract with excess alkali and optional application of heat, which consists essentially of hop oils and aroma compounds in a matrix or environment derived entirely from hops, said matrix or environment containing at least 10% by weight, preferably at least 15% by weight, and most preferably 30% to 60% by weight, of free fatty acid (FFA) substances (as defined and identified by A.O.C.S. Method 5A-40) which are derived from the excess alkali treatment of the starting hop extract.

This particular assay is based upon titration to about pH=9 using phenolphthalein as the indicator. The hop extracts are taken into hexane by addition of acid and desolventized to prepare the extracts for assay. It should be noted that the phrase "lipidic substance", as used herein, does not include hop bitter acids, such as dihydro-isoalpha acids or beta acids, which may be present in the extract at the beginning of the treatment and which are not affected by the process, or hop acids added following the treatment process. These hop bitter acid substances are likewise not included in the definition of "lipidic phase" and must be removed from the extract prior to determination of the Free Fatty Acid Value.

The readily-dispersible lipidic hop extract is preferably produced from a hop extract which is essentially free of hop alpha and beta acids, although this is not critical to all aspects of the invention, but which is essential when a light-stable beer is desired. Heating is the preferred method of accelerating the treatment, whereas high-shear mixing and cosolvent addition may also be employed but are less preferred.

Unexpectedly, the method of preparation of the solubilized hop extract does not damage the quality of the hop flavor and aroma thereof, nor do the free fatty acids (which are liberated in the process, nor do other resulting hydrolysis products create off flavors in the beer or interfere with normal fermentation by yeast. The dispersibility of the lipidic hop extract is improved to such a large extent, over that of the hop extracts presently employed in the brewing industry, that it is even possible to blend in additional hop oil or usual hop extract to further enhance its flavoring potential.

Still other objects of the present invention will become apparent as this disclosure proceeds, and additional objects of the invention will be apparent to one skilled in the art.

SUMMARY OF THE INVENTION

What we claim and believe to be our invention, then, inter alia, comprises the following, alone or in combination:

A water-dispersible lipidic hop extract composition comprising at least 10% by weight of free fatty acid substances derived from hops, as determined by A.O.C.S. Method 5A-40, which is water-dispersible and characterized by increased solubility, availability of the hop aroma and flavor components when said composition is combined with water or with wort, such a composition essentially free of alpha acids and isoalpha acids, such a composition essentially free of beta acids, such a composition comprising hop essential oil as well as free fatty acid substances derived from hops, such a composition comprising free fatty acid substances derived from hops in an amount of at least about 15% by weight of the composition, such a composition wherein the free fatty acid substances are present in an amount of at least about 30% by weight of the composition, such a composition wherein the free fatty acid substances are present in an amount between about 30% and 60% by weight of the composition, such a composition containing added isoalpha acids and/or reduced isoalpha acids, such a composition containing added hop oil to improve dispersibility of the hop oil in water and wort, and such a composition containing added hop extract to improve dispersibility of the hop extract in water and in wort.

Moreover, a process for producing a water-dispersible lipidic hop extract composition, comprising at least 10% by weight of free fatty acid substances derived from hops, as determined by A.O.C.S. Method 5A-40, which is water-dispersible and, which is characterized increased dispersibility, and availability of the hop aroma and flavor components when said composition is combined with water or with wort, which consists essentially of admixing the hop aroma and flavor components of a starting hop extract with an excess of alkali over that required to neutralize any alpha and beta acids present, and then optionaly removing any aqueous phase, thereby producing said lipidic hop extract composition, which is dispersible in water and wort, such a process wherein the excess of alkali employed is greater than 1.5 equivalents of alkali calculated on the amount of alpha and beta acids present in the starting hop extract, such a process in which the starting hop extract is essentially free of alpha acids and isoalpha acids and in which sufficient alkali is employed to raise the pH of the mixture to at least about 13 and maintain the pH above about 10, such a process wherein the pH is maintained above 13, such a process including the step of adding isoalpha acids and/or reduced isoalpha acids into the final composition, such a process including the step of adding hop oil into the final composition to improve dispersibility of the hop oil in water and in wort, such a process wherein hop extract is added into the final composition to improve dispersibility of the hop extract in water and in wort, such a process wherein the admixture is heated at a temperature above about 50° C. until the hop aroma and flavor components are dispersible in water, such a process wherein the admixture is heated at a temperature above about 90° C., such a process wherein a lower-aliphatic alcohol or polyol is employed to aid in the admixture of the alkali and the hop aroma and flavor components, such a process wherein ethanol, glycerine, or propylene glycol is employed, such a process wherein a wetting agent is employed to aid in the admixture of the alkali and the hop aroma and flavor components, such a process in which the admixture of the hop aroma and flavor components and the alkali is facilitated by high-shear mixing, and such a process in which the alkali is aqueous potassium hydroxide or sodium hydroxide.

Further, a beer incorporating the readily-dispersible lipidic hop extract composition as defined in the foregoing, and a light-stable beer incorporating the readily-dispersible lipidic hop extract composition as defined in the foregoing, which composition is essentially free of alpha and isoalpha acids, and finally a beer incorporating a readily-dispersible lipidic hop extract composition as defined in the foregoing, which composition comprises hop essential oil as well as free fatty acid substances derived from hops.

THE INVENTION IN GENERAL

A new readily-dispersible water-dispersible and wort-dispersible lipidic hop extract is disclosed. It may be used to improve the dispersibility and utilization of hop essential oils in the brewing process, contributing enhanced hop aroma and flavor to the resulting beer. This new lipidic form of extract is defined by containing readily-dispersible hop-derived free fatty acid substances, preferably also by the absence of non-isohumulone light-unstable substances and alpha, beta, and isoalpha acids, and by the presence of hop oil to impart a desired hop aroma and flavor to the finished beer. It is preferably free of alpha and beta acids, as well as derivatives thereof such as iso-alpha acids, when a light-stable beer is desired. It is therefore in such case also suitable for use in the brewing of light-stable beers.

DETAILED DESCRIPTION OF THE INVENTION

The following Examples are given to illustrate the present invention, but are not to be construed as limiting:

EXAMPLE 1
Preparation of Dispersible Lipidic Hop Extract from Whole Hop Extract Fifty (50) grams of whole hop extract from liquid $CO_2$ extraction containing 50% alpha acids and 30% beta acids was added to 100 grams of 45% potassium hydroxide in aqueous solution, which is 8 molar equivalents with relation to the alpha and beta acids. This mixture, with a pH of greater than 13, was heated at 100° C. for 8 hours. The aqueous layer was then removed and set aside.

The organic lipidic layer, not including hop bitter acids (which were removed for the analysis), had a Free Fatty Acid value (as defined by A.O.C.S. Method 5A-40) of greater than 15% by weight and showed excellent dispersibility in hot water up to concentrations of 10%. These aqueous dispersions had strong hop aromas.

This demonstrates that removal of the hop acids before alkali treatment, although preferable, is not essential if some degradation of the alpha acids can be tolerated. Such a dispersible lipidic extract, made from an extract containing alpha acids, is not suitable for a beer requiring light stability, since residual light-unstable products of alpha acids are present. It is not necessary to remove beta acids to achieve light stability in beers made using the solubilized extract.

Prior art describes the removal of alpha acids from hops by treatment of hop extract with about one molar equivalent of alkali to extract the alpha acids into water.

The current example uses an amount of alkali in excess of the sum of equivalents of alpha and beta acids contained in the whole hop extract to treat the non-acidic resin with alkali in the presence of the hop acid salts. Treatment of the hop acids with an excess of alkali will cause degradation of the hop acids to produce humulinic acids and other compounds and this is why more than about one molar equivalent, of the sum of alpha and beta acids, of alkali is not used in the prior art. In practice, when alpha and/or beta acids are present, a preferred molar equivalent of more than 1.5 times is used to make the present dispersible lipidic hop extract. A large excess of base increases the base-catalyzed reaction rate. The pH in any event should be greater than about 13.

Alpha and beta acids are commercially valuable materials used to make bittering extracts for the brewing industry. The preferred process for producing the dispersible lipidic hop extract of the invention consists of pretreatment of a hop extract with alkali to remove and collect the alpha and beta acids with subsequent treatment of the non-acidic lipidic extract with alkali to a pH greater than 13 to render the non-acidic lipidic extract dispersible. The less preferred process does not remove the alpha and beta acids before treatment.

EXAMPLE 2
Preparation of Dispersible Lipidic Hop Extract

A. Preparation of Non-Acidic Extract (Resin) Organic Layer

Ten thousand (10,000) grams of a commercial hop extract produced by $CO_2$ extraction containing 50% alpha acids and 30% beta acids was treated with aqueous potassium hydroxide solution to remove the acids in the aqueous layer according to prior art procedure using one molar equivalent of base. The pH was about 13. The non-acidic lipidic resin which remained in the separated organic layer, 870 grams, was used for Part B of this example and for some of the following examples. It was free of alpha, beta, and isoalpha acids.

B. Preparation of Dispersible Free Fatty Acid Hop Extract

One hundred (100) grams of the foregoing non-acidic lipidic resin from hops was mixed with 100 grams of 45% aqueous potassium hydroxide and heated at 95° C. for 10 hours with stirring. The pH was greater than 13. The aqueous layer was then removed and discarded. The residual hop extract was washed with distilled water and the aqueous layer again removed. Alpha acids, iso-alpha acids, and beta acids were non-detectable by HPLC. The Free Fatty Acid (FFA) value (A.O.C.S. Method 5A-40) of this dispersible lipidic extract was 45% by weight in contrast to the starting non-acidic resin value which was 6.7% by weight.

The presence of at least 10%, preferably more than about twice the hop-derived free fatty acids (as defined and identified by this test method 5A-40) than in the untreated extract, and especially at least about 15% as measured by this test, is critical to the present invention. It is these undefined hop-derived FFA substances which make the extract water-dispersible. In practice, levels of at least 20% and preferably 30% to 60% are preferred.

Dispersibility was tested by adding 5 grams of the lipidic hop extracts to 100 grams of water to simulate wort conditions.

TABLE 1

| | Dispersibility of extract: | |
|---|---|---|
| extract | non-acidic resin (FFA 6.7% by wt) | dispersible lipidic hop extract (FFA 45% by wt) |
| in cold water | gummy mixture with oil-all on surface | milky dispersion |
| in hot water | gummy mixture with oil-all on surface | milky dispersion |

The dispersible lipidic hop extract dispersed well in water and the dispersion persisted for more than four hours. In contrast, the starting non-acidic resin floated to the top of the water and did not break up in cold or hot water. The addition of 5 grams of dispersible hop extract to 100 grams of water is in no sense a limit set on the dispersibility of the extract; improved dispersibility is also found to exist at all lower usage levels which would be used in wort to produce an acceptable hop flavor level in beer, e.g., less than 0.05% and even as low as 0.001%, e.g., 0.005%, by weight of the dispersible hop extract.

In an alternate procedure, the alkali solution is added to the organic layer in stages. The initial pH, after addition of a portion of the alkali, is greater than 13, but decreases with the saponification. Additional portions of alkali are then added to maintain the pH above 10 and preferably above 13. The preferred procedure uses sufficient alkali to maintain the pH above 13 during treatment.

EXAMPLE 3
Use of Co-solvent

One hundred (100) grams of non-acidic resin, from the initial Part A of Example 2, was mixed with 60 grams of 45% aqueous potassium hydroxide and 60 grams of ethanol. The pH was greater than 13. This mixture was heated to reflux, about 80° C., and stirred for 6 hours. Fifty (50) grams of water was then added and the aqueous layer removed and discarded. The hop extract was washed again with distilled water with addition of phosphoric acid to lower the pH to 8. The water layer, containing phosphate and other salts, was then removed. Dispersibility was tested by addition of 5 grams of the resulting lipidic non-acidic hop extract, which contained about 25% by weight FFA, to 100 grams of water.

TABLE 2

Dispersibility of Extracts:

| extract | non-acidic resin | dispersible lipidic hop extract |
|---|---|---|
| in cold water | gummy mixture - not dispersible | milky dispersion |
| in hot water | gummy mixture - not dispersible | milky dispersion |

Other co-solvents, such as polyols, e.g., propylene glycol, glycerine, and other lower-aliphatic alcohols, can also be used in this process.

Other wetting agents, such as emulsifiers or edible soaps, can also be used to facilitate mixing of the starting hydrophobic, lipidic non-acidic extract with aqueous alkali. For example, 50 grams of non-acidic resin, from the initial Part A of Example 2, mixed with 25 grams of 45% aqueous hydroxide and 5 grams of glycerol mono-oleate gave, after heating for 8 hours and after removal of the aqueous layer, a lipidic hop extract with excellent water dispersibility. The use of emulsifiers and other organic materials which are not derived from hops is, however, not preferred.

EXAMPLE 4
Added Hop Oil or Non-Acidic Resin

To 20 grams of disperible lipidic hop extract from Example 2 was added 20 grams of hop oil. When 5 grams of this admixture was added to 100 grams of hot water, a milky dispersion with no oil floating to the surface was observed, showing that the disperible lipidic hop extract is capable of carrying added hop oil into water and therefore into boiling wort in a brewery. Hop oil from various manufacturing methods can be used.

One hundred (100) grams of disperible hop extract from Example 2 Part B was blended with 100 grams of untreated, non-acidic extract. When 5 grams of this blend, having a Free Fatty Acid value of 25% by weight, was added to 100 grams of hot water, a milky dispersion with no oil floating to the surface was observed. This demonstrates the use of the disperibility properties of the lipidic hop extract to improve the solubility of untreated non-acidic resin.

EXAMPLE 5
Disperible Lipidic Hop Extract from Hexane Extraction

One hundred (100) grams of commercial hop extract, produced with the use of hexane as solvent, containing 48% alpha acids and 27% beta acids, was mixed with an equal weight of water. 45% potassium hydroxide solution was then added, with stirring, until the pH was about 13. The water layer containing alpha acids and beta acids was removed.

The alpha and beta acid-free organic layer was washed with distilled water and the aqueous layer removed.

The non-acidic extract (organic layer), which had a volume of about 15 ml, was mixed with 12 ml of 45% potassium hydroxide and heated at 100° C. with stirring for 8 hours. The pH was greater than 13. The aqueous layer was removed and the product washed once with 20 ml of distilled water. Thirteen (13) grams of disperible lipidic hop extract, having a FFA value of 30% by weight, was produced. The starting non-acidic resin had a FFA value of 4.7%.

Five (5) grams of the disperible lipidic hop extract formed a milky dispersion when added to 100 grams of water, showing that the product can be made from hexane extracts as well as from carbon dioxide extracts of hops. The higher weight yield starting with hexane extract is a result of the difference in extraction power of the solvents used and of the amount and composition of the non-acidic resins in the hops as well as in the extract. At 25 grams of the disperible lipidic hop extract per 100 grams of water, the extract was fairly dispersible, and at 10–15% by weight excellent dispersion was achieved. A milky dispersion was obtained when less than 10 grams was added to 100 grams of water. In brewing, a 0.001% to 0.05% dispersion in wort can be made by direct addition of the disperible lipidic extract to wort or by pre-dilution in water.

Twenty (20) grams of disperible lipidic hop extract was mixed with 116 grams of untreated non-acidic resin. This mixture had an FFA value of 10%. This mixture was only partially dispersible at 5% in cold water with some material floating to the surface. At 5% in hot water, the mixture dispersed well. This mixture is, therefore, dispersible in boiling wort in a brewery application. A FFA value of 10% is accordingly the practical lower limit for a disperible lipidic hop extract in practice.

EXAMPLE 6
Use of Other Alkaline Solutions

To 100 grams of non-acidic extract from hops, made as in Example 2A, was added 100 grams of 10% aqueous sodium hydroxide. The pH was greater than 13. This mixture was heated under reflux conditions at approximately 100° C. for 12 hours. The mixture was then separated into two layers by centrifugation and the aqueous layer was then removed and discarded. The organic non-acidic lipidic layer, containing 30% by weight of free fatty acid substances, showed excellent dispersibility in hot water at levels up to 5% by weight. Other alkalis, such as lime, or alkaline salts such as sodium phosphate, may be used in place of the sodium hydroxide.

EXAMPLE 7
Process Without Heating

To 100 grams of non-acidic extract from hops, made as in Example 2A, was added 100 grams of 45% aqueous potassium hydroxide to a pH greater than 13. This mixture was vigorously stirred under high-shear conditions for 18 hours at ambient temperature, about 25° C. The aqueous layer was removed and discarded. The organic layer containing 30% FFA by weight showed excellent dispersibility in hot water at levels up to 5%. Although heating decreases treatment time and makes the mixture more fluid during treatment, treatment at ambient temperatures can also be used to produce the disperible lipidic hop extract. From a practical standpoint, treatment at temperatures between about 50° C. and 100° C. is preferred.

EXAMPLE 8
Application in Brewing

Two beers were brewed in pilot-scale equipment using either the non-acidic extract of Example 2A or the disperible lipidic hop extract of Example 2B. Both beers were made with commercially available unhopped malt extracts to achieve 10.60 Plato. The worts were boiled for 55 minutes with the hop extracts (non-acidic and non-acidic lipidic disperible) added at 5 minutes before the end of boil. In each case the amount of hop extract added was 2.3 grams to 19,000 grams of wort. Identical amounts of commercial tetrahydroisoalpha acid were added to each for bitterness. Hop essential oil content of the non-acidic extract and the lipidic disperible non-acidic hop extract were equivalent.

Fermentation and bottling procedures were equivalent. Both beers had a final specific gravity of 1.03. The beers were compared by blind taste panels using panelists experienced in sensory evaluation of beer.

TABLE 3

Sensory Results on Pilot Beers:

| Extract used | Aroma | Flavor |
|---|---|---|
| non-acidic hop extract | slight dry hop | slightly hoppy, light floral |
| dispersible lipidic non-acidic hop extract | floral, hoppy, herbal | strong hop, floral, cedar-like |

The beer made with the readily-disperible lipidic non-acidic hop extract had a distinctly stronger hop aroma and hop flavor than the beer made with usual non-acidic extract. It is believed that this is due to the greater dispersion and utilization of hop oil and other hop aroma components when the disperible lipidic extract is added to boiling wort.

Although the disperible lipidic hop extract was added near the end of the wort boil, part or all of the disperible lipidic hop extract can be added at or near the beginning of the wort boil to counteract the tendency for overfoaming in the kettle. It is preferable that at least part of the disperible lipidic hop extract be added near the end of wort boil, or even after completion of the boiling period, to minimize evaporative loss of the volatile hop oils therein.

The excellent dispersibility of the solubilized lipidic extract enables its direct addition to the wort or predilution of the extract in water to facilitate pumping of the diluted extract into the wort.

EXAMPLE 9

The beer made in Example 8 was bottled in clear flint bottles and exposed to 8 hours of cool-white fluorescent light in a cooler kept at 5° C. There was no detectable mercaptan aroma, which would be produced from the presence of non-isohumulone light-unstable products such as alpha, beta, or isoalpha acids under such light exposure. This shows that the solubilized lipidic non-acidic hop extract can be used to produce aroma in a light-stable beer made with reduced (and therefore light-stable) hop extracts, and that the beer will remain light stable.

Although the solubilized lipidic hop extract was added directly to the boiling wort in the kettle in Example 8, an alternate addition procedure is to disperse and dilute the extract in water before addition. Addition can also be carried out later in the brewing process, such as after trub removal or at the same stage as yeast addition.

Other applications of the solubilized lipidic hop extract to increase the flavor and aroma content of a beer will be obvious to one skilled in the art. The solubilized lipidic hop extract can be added late in the wort boil to improve the hop aroma of a beer hopped with hop cones or hop pellets.

If desired, the solubilized lipidic extract can be combined with hops or a hop acid such as humulone, isohumulone, dihydroisohumulone, or tetrahydroisohumulone and added at the kettle, thereby avoiding the requirement of post-fermentation bittering.

It is accordingly seen from the foregoing that a novel solubilized lipidic hop extract has been provided, as well as a method for the preparation thereof and a method for the utilization thereof in enhancing the flavor and aroma of beer produced therefrom, as well as beer and light-stable beer produced therefrom, and whereby all of the other objects of the present invention have been attained.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

We claim:

1. A lipidic hop extract composition, for imparting hop aroma and flavor to beer, containing hop essential oil and flavor and aroma substances derived from hops, comprising at least 10% by weight of free fatty acids derived from hops by saponification of a non-acidic lipidic resin present in a hop extract, as determined by A.O.C.S. Method 5A-40, said composition is essentially free of alpha and isoalpha acids and water-dispersible when said composition is combined with water or with wort.

2. A composition of claim 1, essentially free of beta acids.

3. A composition of claim 1, comprising free fatty acid substances derived from hops in an amount of at least about 15% by weight of the composition.

4. A composition of claim 3, wherein the free fatty acid substances are present in an amount of at least about 30% by weight of the composition.

5. A composition of claim 4, wherein the free fatty acid substances are present in an amount between about 30% and 60% by weight of the composition.

6. A composition of claim 1, containing added reduced isoalpha acids.

7. A composition of claim 1, containing added hop oil.

8. A composition of claim 1, containing added hop extract.

* * * * *

UNITED STATES PATENT AND TRADEMARK OFFICE
CERTIFICATE OF CORRECTION

PATENT NO. : 6,242,038 B1 Page 1 of 1
APPLICATION NO. : 08/972914
DATED : June 5, 2001
INVENTOR(S) : James A. Guzinski and Mark H. Schulze It is certified that error appears in the above-identified patent and that said Letters Patent is hereby corrected as shown below:

Bibliographic Page, References Cited : -- 2050968 * 5/1971 (Germany) -- is missing, please add under Foreign Patent Documents.

Bibliographic Page, References Cited : -- 2398799 * 2/1979 (France) -- is missing, please add under Foreign Patent Documents.

Bibliographic Page, References Cited : -- JRA Pollack, Brewing Science, Vol. 1, Academic Press, New York, 1979, p. 314 and 315 -- is missing, please add under Other Publications.

Bibliographic Page, References Cited : -- JRA Pollack, Brewing Science, Vol. 2, Academic Press, New York, 1979, p. 230 - 232. -- is missing, please add under Other Publications.

Signed and Sealed this

Fifteenth Day of January, 2008

JON W. DUDAS
*Director of the United States Patent and Trademark Office*